US009999489B1

(12) United States Patent
Kern, Sr.

(10) Patent No.: US 9,999,489 B1
(45) Date of Patent: Jun. 19, 2018

(54) ANIMAL LIFTING TABLE WITH OFFLOADING RAMP

(71) Applicant: Theodore E. Kern, Sr., Colchester, IL (US)

(72) Inventor: Theodore E. Kern, Sr., Colchester, IL (US)

( * ) Notice: Subject to any disclaimer, the term of this patent is extended or adjusted under 35 U.S.C. 154(b) by 0 days. days.

(21) Appl. No.: 15/704,142

(22) Filed: Sep. 14, 2017

(51) Int. Cl.
| | | |
|---|---|---|
| *B66F 3/22* | (2006.01) | |
| *A61D 3/00* | (2006.01) | |
| *B66F 7/06* | (2006.01) | |
| *A01K 13/00* | (2006.01) | |
| *A61G 13/06* | (2006.01) | |

(52) U.S. Cl.
CPC ............... *A61D 3/00* (2013.01); *A01K 13/00* (2013.01); *B66F 7/065* (2013.01); *B66F 7/0625* (2013.01); *A61G 13/06* (2013.01)

(58) Field of Classification Search
CPC .. B66F 7/00; B66F 7/065; B66F 7/085; B66F 7/12; B66F 9/00; B66F 9/04
See application file for complete search history.

(56) References Cited

U.S. PATENT DOCUMENTS

| | | | | |
|---|---|---|---|---|
| 4,447,041 A | * | 5/1984 | Fujita | B66F 7/0625 254/122 |
| 4,447,042 A | * | 5/1984 | Masui | B66F 7/0641 187/204 |
| 4,558,847 A | | 12/1985 | Coates | |
| 6,059,263 A | * | 5/2000 | Otema | B66F 7/0691 254/10 R |
| 7,810,788 B2 | * | 10/2010 | DeVries | B65G 15/00 254/122 |
| 2010/0243973 A1 | * | 9/2010 | Deuring | B66F 3/22 254/122 |

* cited by examiner

*Primary Examiner* — Lee D Wilson
(74) *Attorney, Agent, or Firm* — Dale J. Ream (57) ABSTRACT

A lifting and supporting table according to the present invention includes an upper platform having a receiving surface and a lower frame supporting the upper platform. The lifting and supporting table includes a linkage interacting with the lower frame such that adjustment of the linkage forces a height of the upper platform to change. A ramp assembly includes a ramp having a top surface that operatively extends the receiving surface of the upper platform, the ramp being selectively moveable between a horizontal position and an inclined position.

19 Claims, 10 Drawing Sheets

ANIMAL LIFTING TABLE WITH OFFLOADING RAMP

BACKGROUND OF THE INVENTION

This invention relates generally to mobile tables for lifting and supporting patients, such as animals, and more particularly, to an animal lifting table having an adjustable height and a ramp that is movable between a deployed configuration level with the rest of the table and a released configuration that is downwardly sloped so as to aid in offloading or directing the animal into a cage for recovery or boarding.

A veterinarian is trained and licensed to give medical treatment to animals, including assisting with birthing of baby animals, treating diseases, and treating injuries. Animals are usually lifted onto an examination table in a clinical setting and frequently into a kennel for overnight or extended stays at the clinic. Kennels are often stacked atop one another so that a multitude of animals may be kept in a single room. Either occasion for lifting may be difficult with larger or heavier animals.

To facilitate raising an animal to an appropriate height position for treatment, an examination table may include a jack and lift assembly. Various lift tables have been proposed in the art for lifting an animal from a retracted or floor surface to a height that is comfortably reachable by the veterinarian. Although presumably effective for their intended purposes and while this reduces the number of times a veterinarian must lift a heavy animal in order to examine or treat the animal, the animal must still be lifted into a kennel. This additional lifting, of course, may be difficult or even result in back injuries to the veterinarian or technician, especially when a heavy animal must be lifted into a stacked kennel.

Therefore, it would be desirable to have a lifting and supporting table for raising an animal upwardly to a position readily accessible to a veterinarian giving an examination or treatment. Further, it would be desirable to have a lifting and supporting table having a ramp assembly that extends the work space of the examining table and that may also be inclined to offload the animal into a stacked or raised kennel without having to manually lift the animal again.

SUMMARY OF THE INVENTION

A lifting and supporting table according to the present invention includes an upper platform having a receiving surface and a lower frame supporting the upper platform. The lifting and supporting table includes a linkage interacting with the lower frame such that adjustment of the linkage forces a height of the upper platform to change. A ramp assembly includes a ramp having a top surface that operatively extends the receiving surface of the upper platform, the ramp being selectively moveable between a horizontal position and an inclined position.

Therefore, a general object of this invention is to provide a lifting and supporting table for selectively lifting, supporting, transporting, and offloading an animal, such as a pet being cared for by a veterinarian.

Another object of this invention is to provide a lifting and supporting table, as aforesaid, that is movable by a scissor jack assembly between a retracted configuration adjacent a floor surface and an extended or raised configuration so that an animal positioned thereon is easily accessible to a standing person, e.g. by a veterinarian.

Still another object of this invention is to provide a lifting and supporting table, as aforesaid, having a ramp assembly at one end that may be inclined and used to slide an animal into a kennel, even an elevated kennel, without excessive effort by or injury to, a user of the lifting table.

Yet another object of this invention is to provide a lifting and supporting table, as aforesaid, that is inexpensive to produce and user-friendly to operate.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments.

An animal lifting table 10 according to an embodiment of the present disclosure will now be described in detail with reference to FIGS. 1-9 of the accompanying drawings. The lifting table 10 includes a lower frame 12, an upper platform 14, a handle 16, a jack assembly 18, a ramp assembly 20, a linkage assembly 22, front wheels 24, and back wheels 26. The front and back wheels 24, 26 extend from the lower frame 12 and allow for mobility of the entire lifting table 10. And particularly for mobility and shipping, it may be desirable for appropriate portions of the lifting table 10 to be constructed of lightweight materials, such as lightweight metals (e.g., aluminum, light gauge stainless steel, etc.), plastics (e.g., polycarbonates, etc.), and composites.

The lower frame 12 supports the upper platform 14 and has first and second lengthwise members 30, 32 and first and second transverse members 34, 36. The first and second lengthwise members 30, 32 may be, for example, be portions of elongate tubes, and the first and second lengthwise members 30, 32 each have a roll channel A, A'. In the illustrated example, the channels A, A' may be located interiorly and facing upwardly towards the upper platform 14. The roll channels A, A' are substantially U-shaped, having a bottom 37, 37' and two lateral sides 39, 39', 41, 41'. The channels A, A' capture a wheel or roller 38 on the lower ends 124, 126 of linkage 22 as will be further discussed below.

The first and second transverse members 34, 36 are fixed to the first and second lengthwise members 30, 32 at a lifting table anterior end 42 and a posterior end 44, respectively. The first transverse member 34 has a top platform surface 49 facing the upper platform 14. And each of the first and second transverse members 34, 36 respectively has a front surface 46, 48 facing the anterior end 42 of the lifting table 10. The front surface 46 of the first transverse member 34 may further define an indent, semi-circular groove, or cut-out 50, so as not to interfere with the ramp assembly 20. In the illustrated example, the second transverse member 36 defines two opposed apertures 52 that are aligned with the first and second lengthwise members 30, 32, respectively, and oriented toward the top platform 14. Each of the apertures 52 defines an inner surface sized and shaped to fit upwardly extending arms 60, 62 of the handle 16 as will be further discussed below.

Those skilled in the art will appreciate that the front wheels 24 and the rear wheels 26 may be free to spin about respective vertical axes for steering purposes or may be fixed as desired. The front wheels 24 are illustrated as engaging an extension 64 having a ramped surface 66 that slopes to an adjacent channel surface 68 adjacent an upwardly extending surface 70. The upwardly extending surface 70 extends from the front surface 46 of the first transverse member 34, and the channel surface 68 has a substantially similar width as the top platform surface 49 of the first transverse member 24.

The jack assembly 18 extends from the second transverse member 36 and includes a base 78, a jack 79, and a jack control 80. The base 78 has an anterior facing surface 81 that affixes, engages, or otherwise attaches to a back surface 49 of the second transverse member 36. The base 78 may further include a platform surface 82 sized and shaped to situate the jack control 80 upon, two sloped ramp surfaces 84, 86 positioned laterally from the platform surface 82, and two top surfaces 88, 90, situated adjacent the ramp surfaces 84, 86 respectively. In the illustrated exemplary embodiment, the rear wheels 26 are attached to the top surfaces 88, 90. The top surface 88, 90 may also act as a guard against unintentional obstruction of the rear wheels 26 rotating.

While the jack 79 may be electric or pneumatic, it may be particularly desirable for the jack 79 to be a hydraulic jack. Thus, the jack 79 may also be referred to herein as a hydraulic jack 79 and the jack control 80 may be referred to as a hydraulic jack control 80.

The hydraulic jack control 80 may further include a foot pedal 92 and a brake 94 for the rear wheels 26. The foot pedal 92 controls the operation (i.e., extension and retraction) of the hydraulic jack 79. More particularly, the hydraulic jack 79 has a telescoping hydraulic cylinder 96, such that fluid is pumped into or released from the cylinder 96 by means of the foot pedal 92, such that a rod 98 extends from the cylinder 96 and lifts up or drops down the upper platform 14. The hydraulic jack 79 is pivotally connected to first and second connecting members 100, 102 on opposed ends 104, 106, as will be further discussed below.

The handle 16 includes upwardly extending arms 60, 62, a transverse bar 110, and sloped connections 112, 114. The handle 16 may be shaped and constructed from a tubular material, though other materials may be used as well. The height of the upwardly extending arms 60, 62 is substantially equivalent to a maximum height of the upper platform assembly 14. The sloped connections 112, 114 are respectively adjacent the upwardly extending arms 60, 62 and inclined upwardly and away from the upper platform assembly 14. The transverse bar 110 connects the sloped connections 112, 114 to one another. The upwardly extending arms 60, 62 may be positioned on the second transverse member 36, both the first and second lengthwise members 30, 32, or the hydraulic jack base 78. In the illustrated example, the upwardly extending arms 60, 62 are positioned within apertures 52, 54 of the second transverse member 36.

Figure 4A:
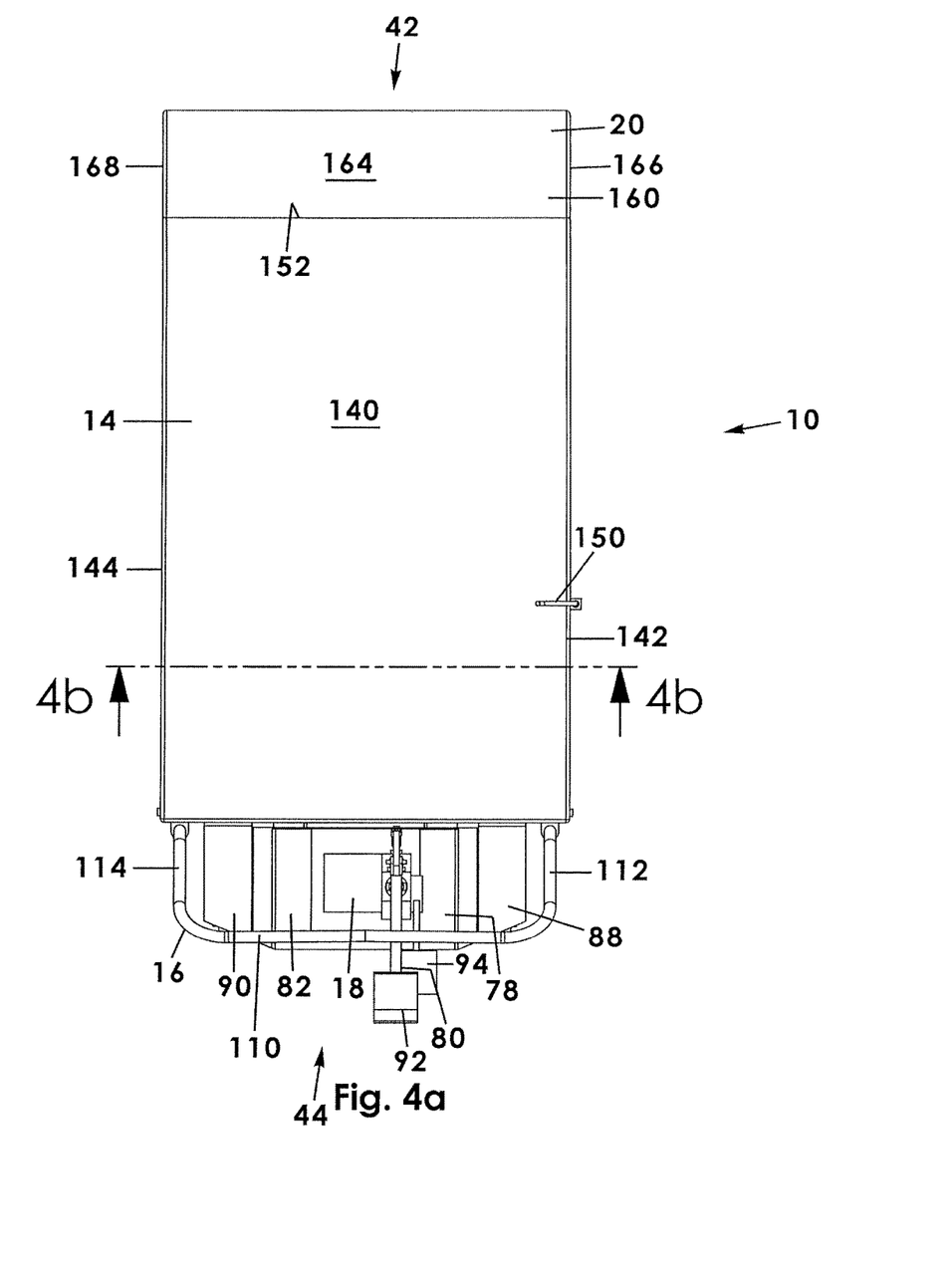
FIG. 4a is a top view of the animal lifting table of FIG. 1.
Figure 4B:
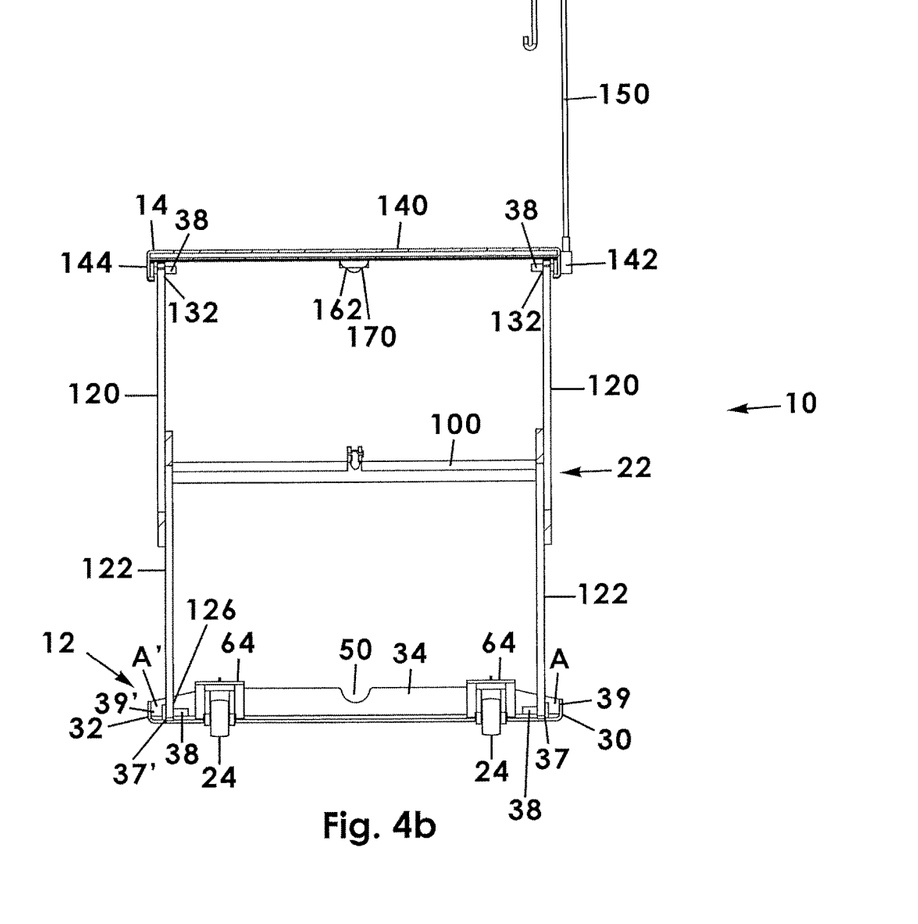
FIG. 4b is a cross section view of the animal lifting table of FIG. 1 along the line 4b-4b.

The linkage assembly 22 may be any type of mechanism that alters the height of the upper platform 14. It is foreseen that the linkage assembly 22 may also adjust the angle of the upper platform 14. In the illustrated example, the linkage assembly 22 is a scissor linkage (or "cross member" linkage) having first and second arms 120, 122 and may further include connecting members 100, 102. In the illustrated example, there are two sets of the laterally spaced cross arms 120, 122. At a first end 124, 126, one of the first and second arms 120, 122 may be attached to the first and second lengthwise members 30, 32 and the other arm at the first end has a circular roller 130 attached thereto. The roller 130 is configured to travel lengthwise along the channel A, A'. Likewise, at a second end 132, 134, one of the first and second arms 120, 122 may be attached to the upper platform 14 and the other arm at the second end has a circular roller 130 attached thereto. This roller 130 is configured to travel lengthwise along a second channel B, B' (FIG. 4b). In this configuration, one arm 120, 122 is pivotally fixed while the other arm 122, 120 is mobile along the respective channel A, A', B, B'. In the illustrated example of FIG. 3b, both arms 120 are pivotally fixed on the first and second lengthwise members 30, 32 at the first end 124 and have the roller 130 at the second end 132. And both arms 122 have the roller 130 pivotally attached at the first end 126 and are pivotally fixed at the second end 134.

Figure 1:
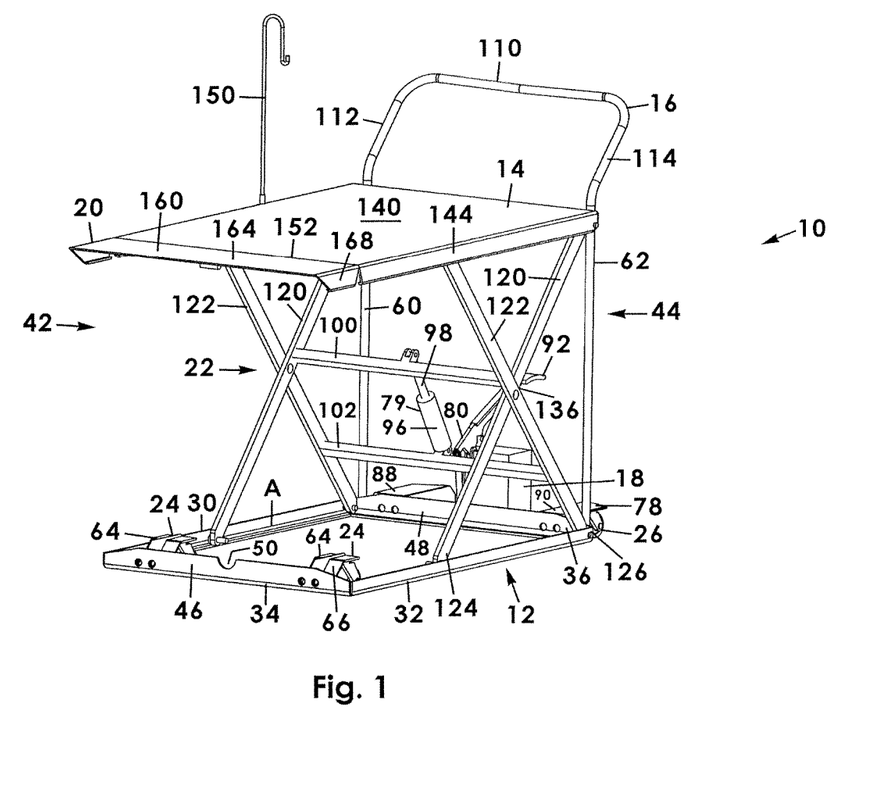
FIG. 1 is a perspective view of an animal lifting table according to the present invention
Figure 2:
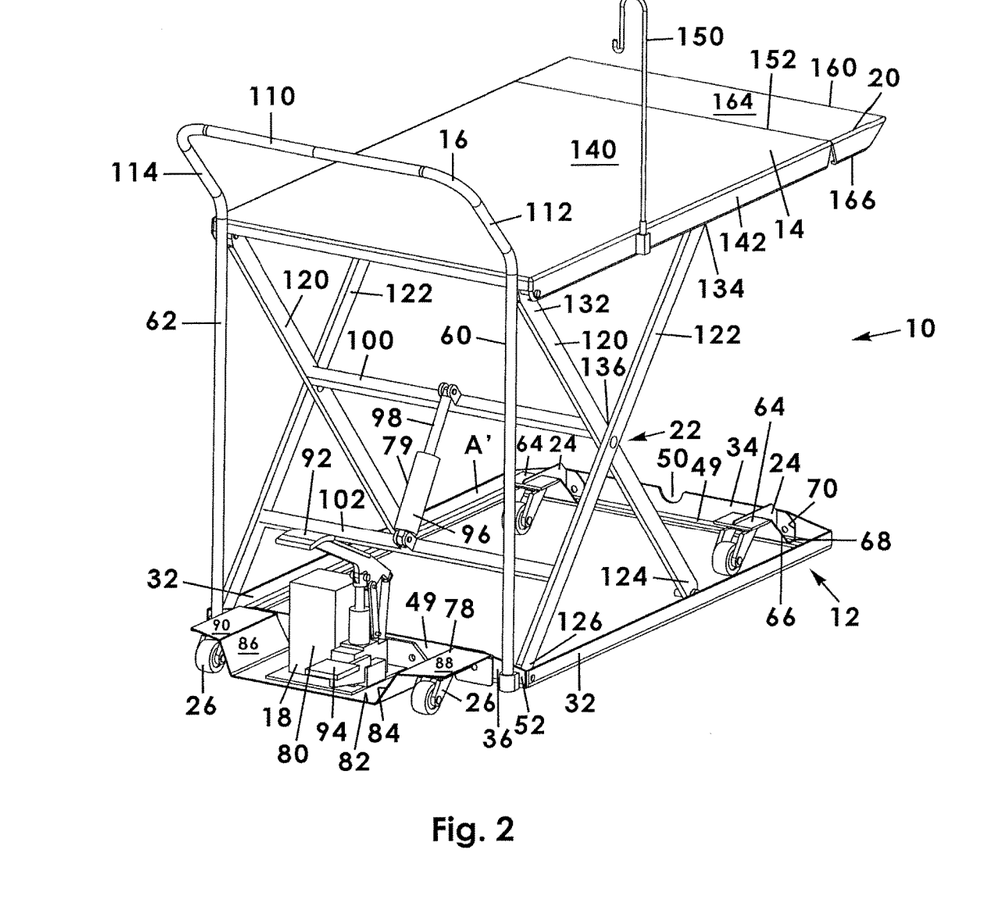
FIG. 2 is a back perspective view of the animal lifting table of FIG. 1.
Figure 3A:
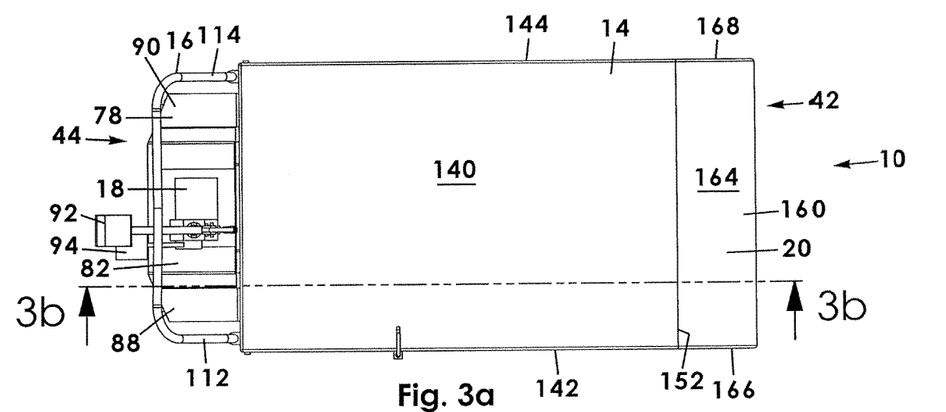
FIG. 3a a top view of the animal lifting table of FIG. 1.
Figure 3B:
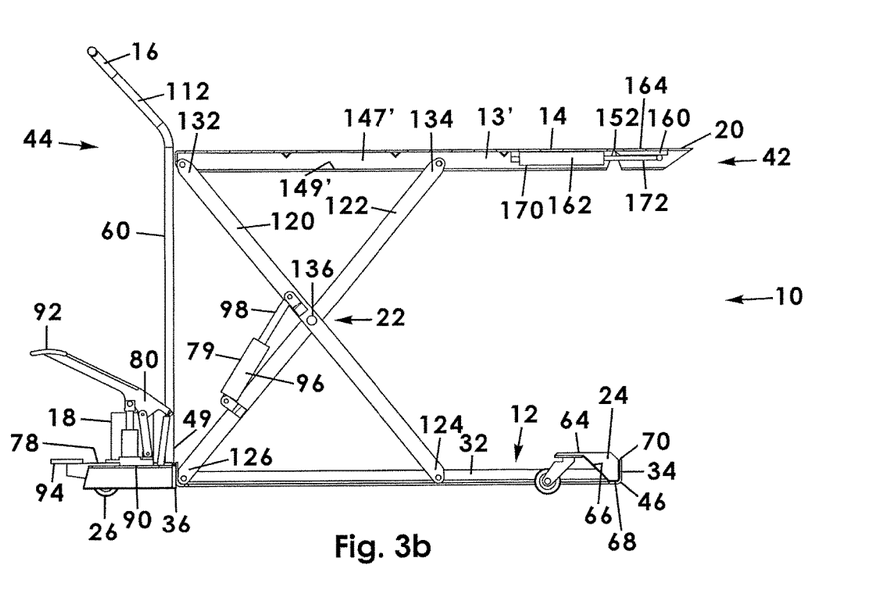
FIG. 3b is a cross section view of the animal lifting table of FIG. 1 along the line 3b-3b.
Figure 5:
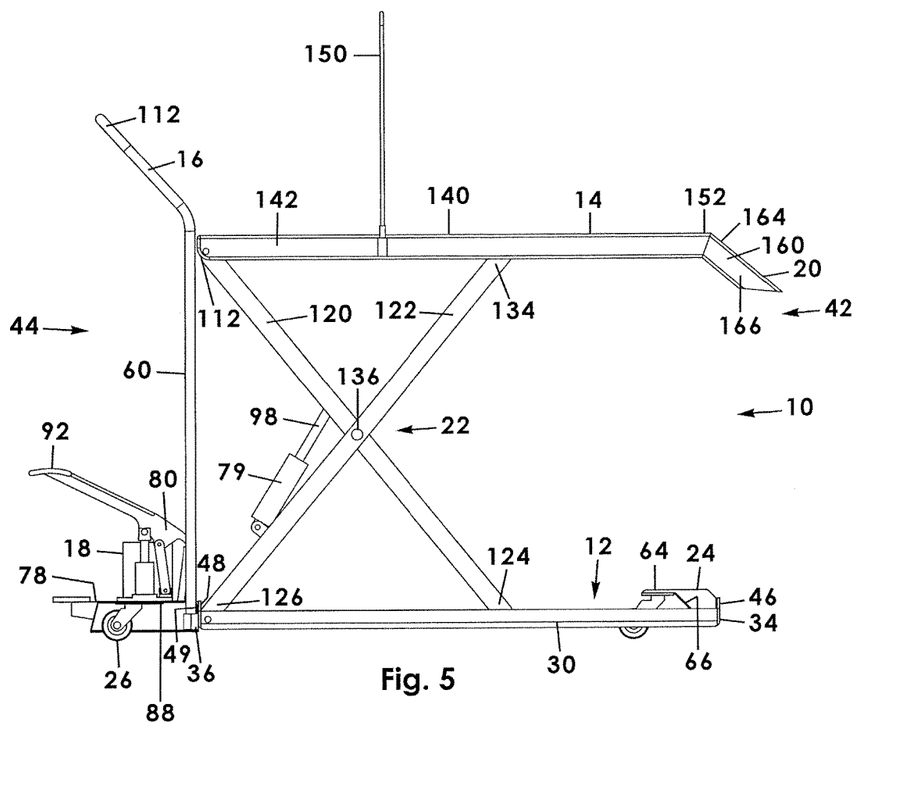
FIG. 5 is a side view of the animal lifting table of FIG. 1 in a first upright heightened position or observation position with the ramp in a lowered state.
Figure 6:
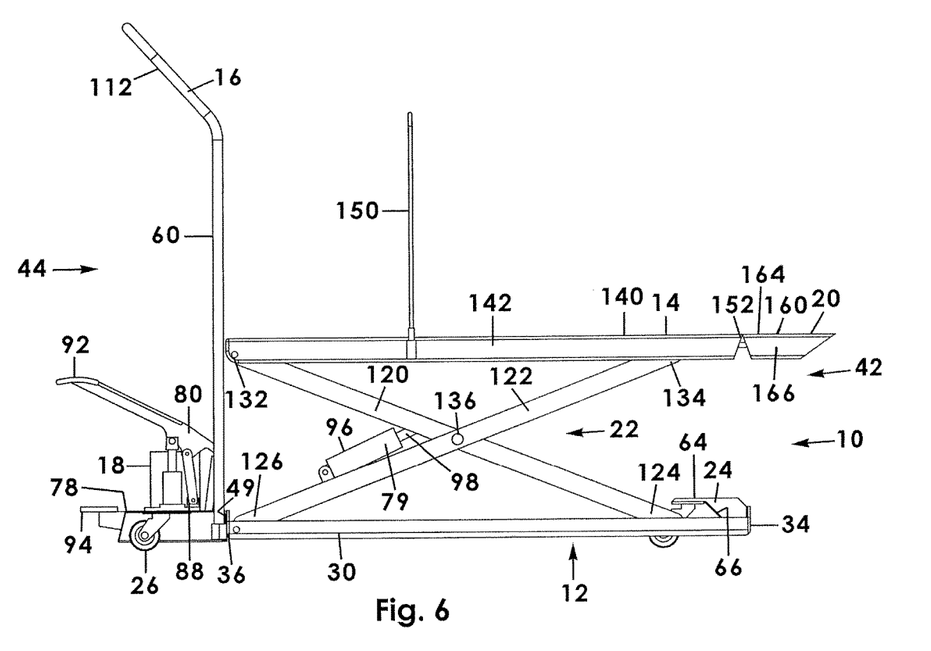
FIG. 6 is a side view of the animal lifting table of FIG. 1 in a second upright heightened position.
Figure 7:
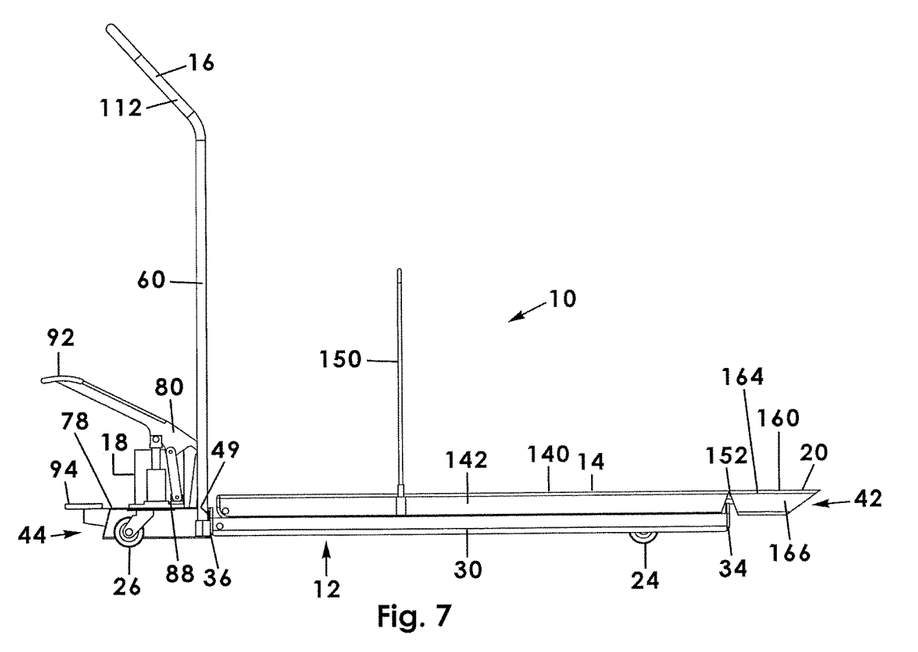
FIG. 7 is a side view of the animal lifting table of FIG. 1 in a lowered position.
Figure 8:
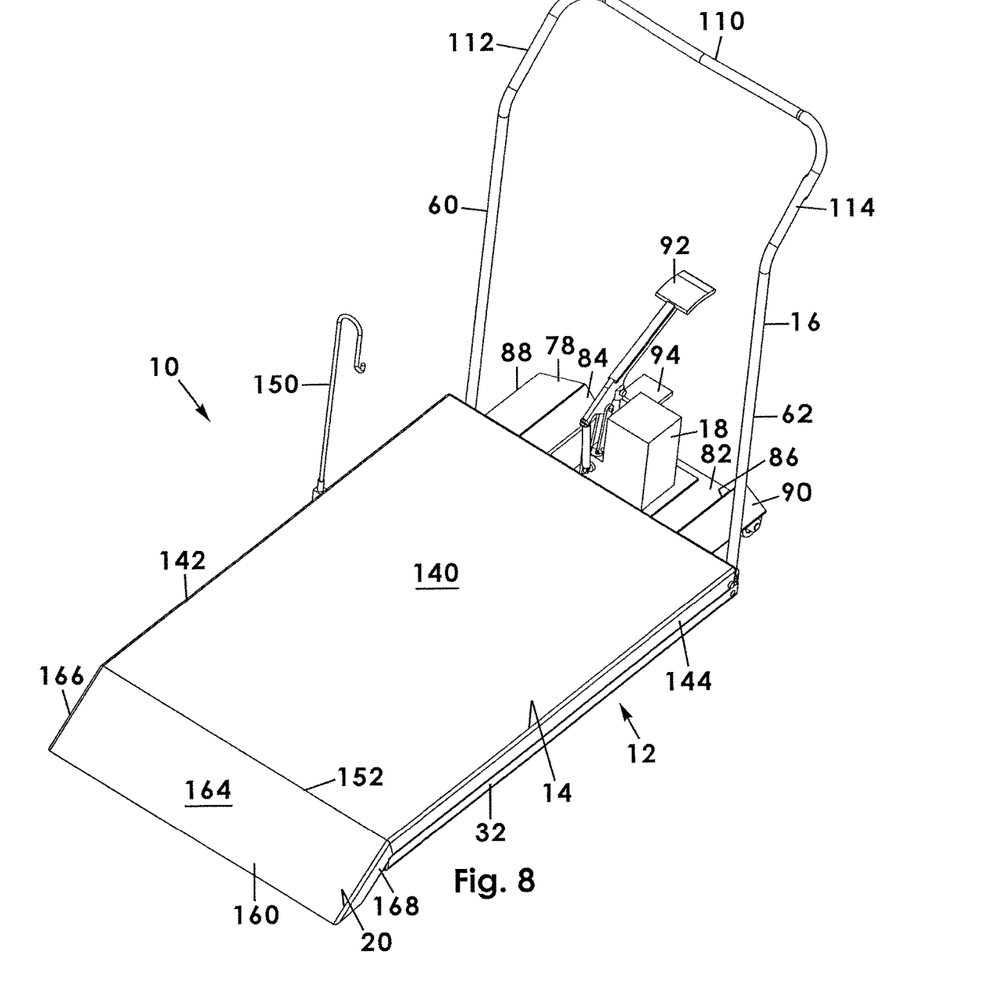
FIG. 8 is a top perspective view of the animal lifting table of FIG. 1 in an unloading position with the ramp in a lowered state.
Figure 9:
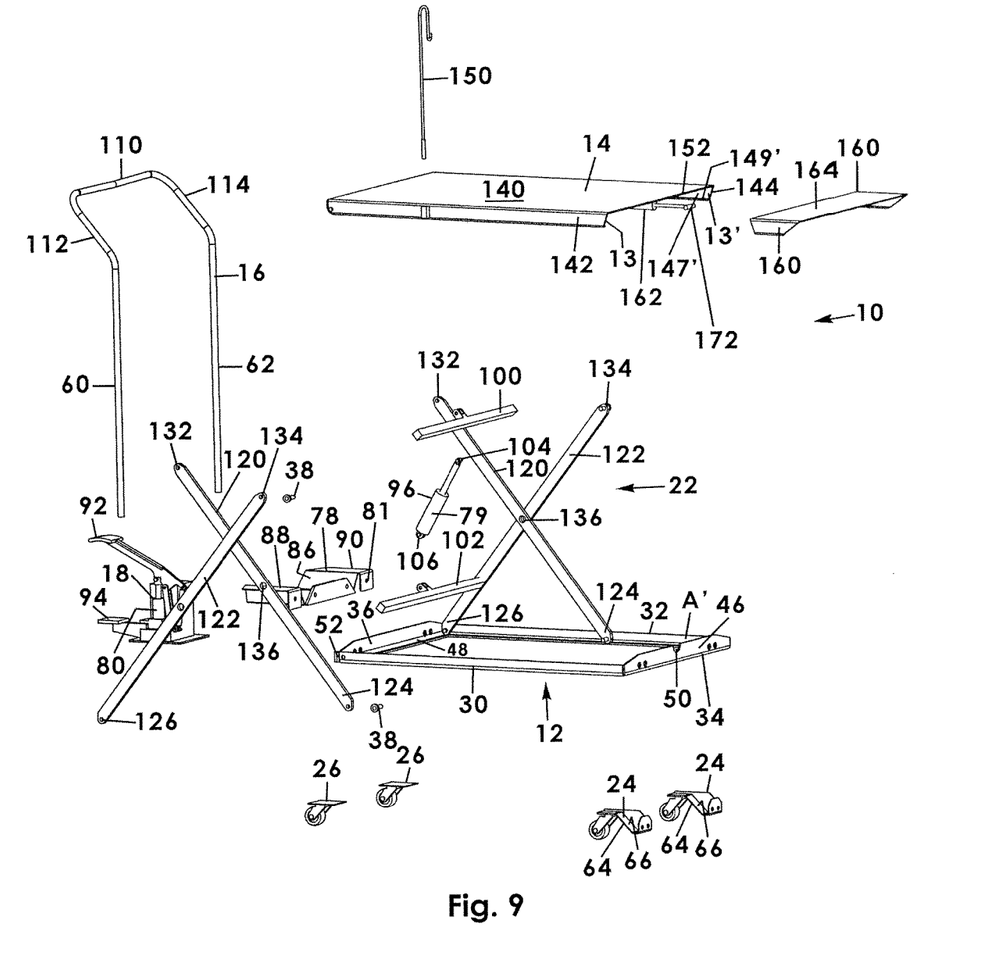
FIG. 9 is an exploded view of the animal lifting table of FIG. 1.

The arms 120, 122 are connected to the opposed arms 120, 122 by connecting members 100, 102. The arms 120, 122 and connecting members 100, 102 may, for example, be tubular. The connecting member 100 is attached a point 136 at or near where the arms 120, 122 cross each other (FIG. 2). And the connecting member 102 is located near the first end 124 of the first arm 120. The hydraulic jack 79 is pivotally connected to the connecting members 100, 102, and the hydraulic jack 79 controls the position of the arms 120, 122 to selectively adjust the upper platform 14 position (FIG. 6). As the arms 120, 122 spread apart, the upper platform 14 is lowered into an unloaded position (FIGS. 7-8). And as the arms 120, 122 draw nearer, the upper platform 14 is raised into an observation position (FIGS. 5-6).

The upper platform 14 includes a receiving surface 140 that is rectangular and dimensioned to position an animal, human, or the like upon. Preferably, the receiving surface 140 has a generally flat configuration. The upper platform 14 further includes two lateral sides 142, 144, and a bottom surface 146. On the bottom surface 146 and laterally located on each side 142, 144 are roll channels B, B'. The second set of roll channels B, B', like roll channels A, A' are substantially L-shaped having a bottom 147, 147' and a lateral side 149, 149'. The channels B, B' capture a wheel or roller 38 on the upper ends 132, 134 of linkage 22 as will be further discussed below.

The upper platform 14 may also include accessories, such as bag holders 150, suitable surgical equipment, instrument trays, stands for electronic instruments, and the like. In the illustrated exemplary embodiment, an IV bag holder 150 is located on the side 142.

Situated at the anterior end 152 of the upper platform 14 is the ramp assembly 20. The ramp assembly 20 is positioned to abut against the upper platform 14 or may be hinged where the ramp assembly 20 and the upper platform 14 meet. The ramp assembly 20 includes a ramp 160 and a manipulation mechanism 162, and the ramp 160 has a top horizontal surface 164 and two side surfaces 166, 168. The top surface 164 may run aligned and in parallel with the top surface 140 of the upper platform 14 so that the ramp in a first position may act as an extension of the upper platform 14. Likewise, the side surfaces 166, 168 may extend the lateral sides 142, 144 of the upper platform 14. The manipulation mechanism 162 may include a cylinder 170 and a pushrod 172. The pushrod 172 prevents the ramp 160 from being undesirably lowered further. Once the pushrod 172 is released back into the cylinder 170, the ramp is lowered into a second position or unloading position (FIG. 5). The ramp 160 eases the sliding of humans, animals or carrying cages (e.g., kennels, etc.) on and off the lifting table 10. The ramp 160 may be situated such that a bottom surface 175 abuts against a ground surface when the upper platform 14 is fully lowered. As such, the upper platform 14 may engage the lower frame 12. The manipulation mechanism 162 controls the position of the ramp 160, and it is foreseen that this may be hydraulic or pneumatic. It is understood that other positions besides the first and second positions of the ramp are possible, as the ramp 160 may be incrementally inclined upward and downward. Further, the ramp 160 may be positioned to be perpendicular to the upper platform 14, and thereby create a small barrier to dis-incentivize escape or limit movement of an animal on the receiving surface 140.

It is understood that while certain forms of this invention have been illustrated and described, it is not limited thereto except insofar as such limitations are included in the following claims and allowable functional equivalents thereof. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. Further, it will be understood that certain features and subcombinations may be of utility and may be employed within the scope of the disclosure. Further, various steps set forth herein may be carried out in orders that differ from those set forth herein without departing from the scope of the present methods. This description shall not be restricted to the above embodiments. It is to be understood that while certain forms of the present invention have been illustrated and described herein, it is not to be limited to the specific forms or arrangement of parts described and shown.

The invention claimed is:

1. A lifting and supporting table, comprising:
   an upper platform having a receiving surface;
   a lower frame supporting said upper platform;
   a linkage interacting with said lower frame such that adjustment of said linkage forces a height of said upper platform to change;
   a ramp assembly having a ramp with a top surface, said top surface of said ramp operatively extending said receiving surface of said upper platform, said ramp being selectively moveable between a horizontal position and an inclined position; and
   a bag holder extending from said upper platform.

2. The lifting and supporting table of claim 1, wherein said lower frame includes:
   first and second lengthwise members running parallel to one another; and
   first and second transverse members, said first and second transverse members each being fixed to both said first and second lengthwise members such that said first and second lengthwise members are stationary relative to one another.

3. The lifting and supporting table of claim 2, wherein at least one of said first and second lengthwise members defines a channel.

4. The lifting and supporting table of claim 2, wherein at least one of said first and second transverse members defines a cut-out.

5. The lifting and supporting table of claim 1, further comprising front and back wheels extending from said lower frame.

6. The lifting and supporting table of claim 1, further comprising a handle situated on a posterior end of said lifting table.

7. The lifting and supporting table of claim 1, further comprising a jack assembly, said jack assembly including a hydraulic jack operably connected to said linkage.

8. The lifting and supporting table of claim 7, wherein said hydraulic jack is operated by a foot pedal.

9. The lifting and supporting table of claim 1, wherein:
   said linkage includes first and second arms;
   said first and second arms have respective upper and lower ends; and
   said first and second arms cross each other at an engagement point.

10. The lifting and supporting table of claim 9, wherein said first arm lower end has a roller configured to travel along a channel in said lower frame.

11. The lifting and supporting table of claim 9, wherein:
    said first and second arms are a first set of arms;
    said linkage further includes a second set of arms; and
    a connecting member engages both said first set of arms and said second set of arms.

12. The lifting and supporting table of claim 11, further comprising a jack assembly, said jack assembly including a hydraulic jack engaging said connecting member.

13. The lifting and supporting table of claim 1, wherein said upper platform includes two lateral sides.

14. The lifting and supporting table of claim 13, wherein said lateral sides each have an inwardly extending protrusion that respectively defines first and second channels.

15. The lifting and supporting table of claim 14, wherein said linkage includes:
    first and second arms each having respective upper and lower ends, said first and second arms crossing each other at an engagement point; and
    said first arm upper end having a roller engaged with and configured to travel along one of said channels.

16. The lifting and supporting table of claim 1, wherein said ramp assembly further including a manipulation mechanism, said manipulation mechanism controlling inclination of said ramp.

17. The lifting and supporting table of claim 16, wherein said manipulation mechanism is a pushrod.

18. A lifting and supporting table, comprising:
   an upper platform having a flat receiving surface;
   a lower frame positioned below and supporting said upper platform;
   a scissor linkage mechanism configured to adjust a height of said upper platform, said scissor linkage mechanism being positioned between said upper platform and said lower frame;
   a hydraulic jack assembly connected to said scissor linkage mechanism, said hydraulic jack assembly including a jack capable of moving said scissor linkage mechanism between a contracted configuration and an extended configuration;
   a ramp assembly having a ramp with a top surface, said top surface of said ramp operatively extending said receiving surface of said upper platform;
   a pushrod coupled to said ramp for selectively moving said ramp between a horizontal position and an inclined position; and
   a bag holder extending from said upper platform.

19. The lifting and supporting table of claim 18, wherein:
   said upper platform includes two lateral sides;
   said lateral sides each have an inwardly extending protrusion that respectively defines first and second channels;
   said linkage includes:
      first and second arms each having respective upper and lower ends, said first and second arms crossing each other at an engagement point; and
      said first arm upper end having a roller engaged with and configured to travel along one of said channels.

* * * * *